April 4, 1950     A. R. MAIER     2,502,969
POWER INPUT CONTROL FOR WELL DRILLING HOISTS
Filed Jan. 30, 1945     3 Sheets-Sheet 2
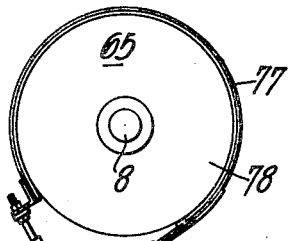
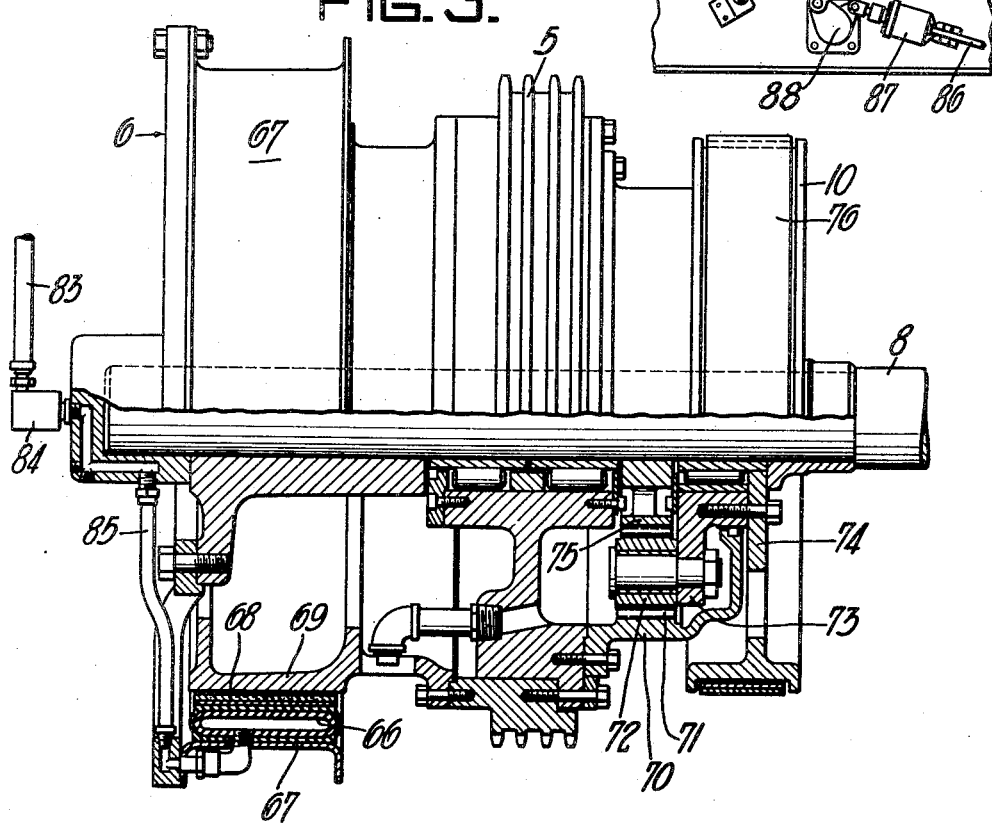
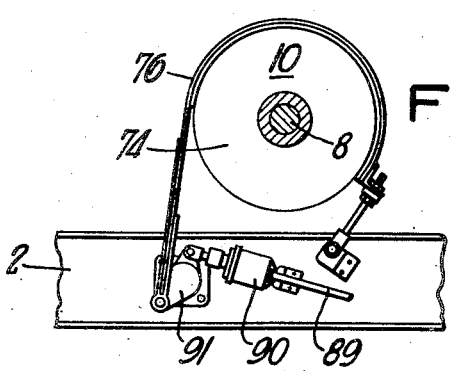
INVENTOR:
AUGUST R. MAIER,
BY: John E. Jackson
his Attorney.

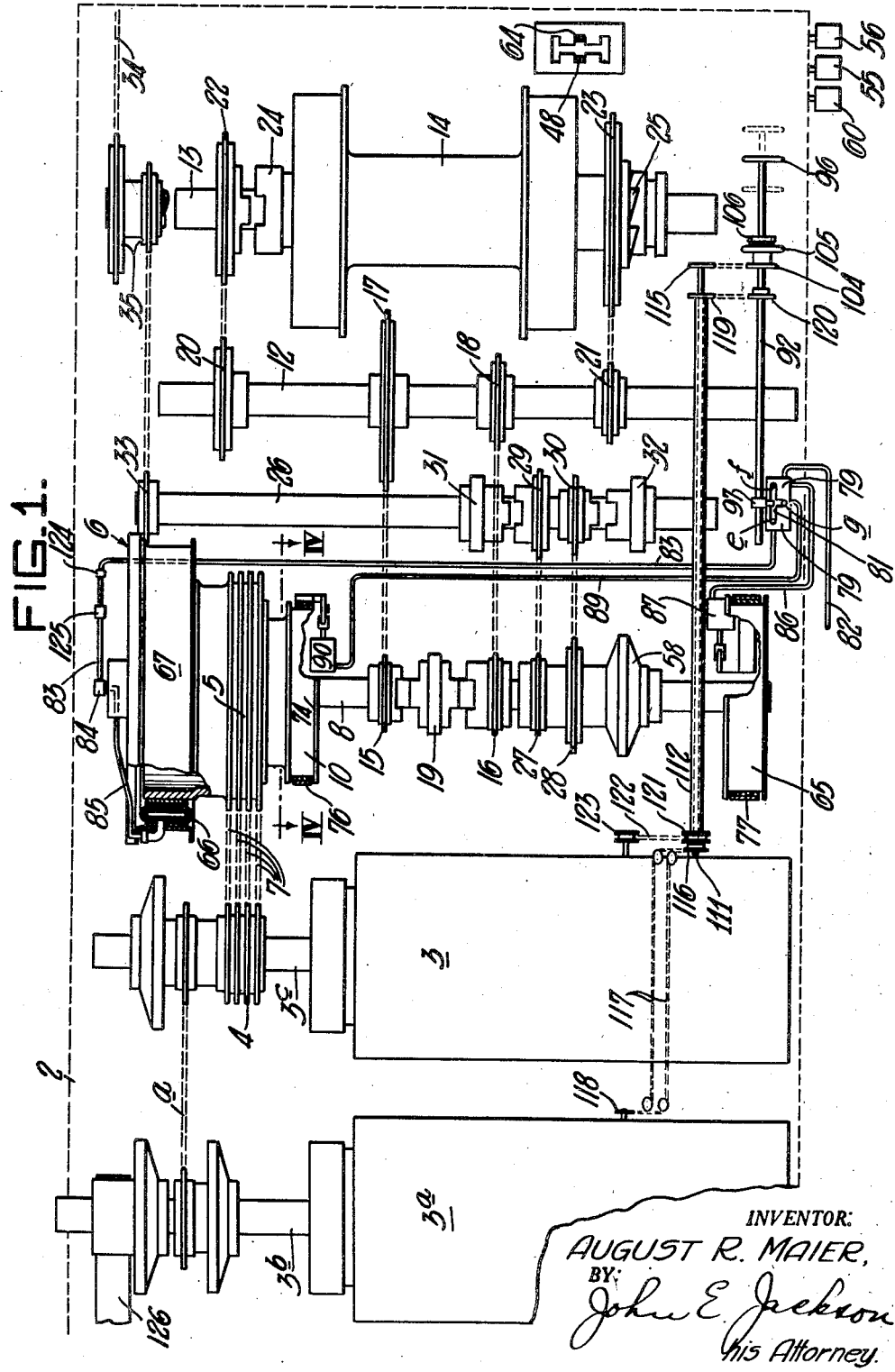

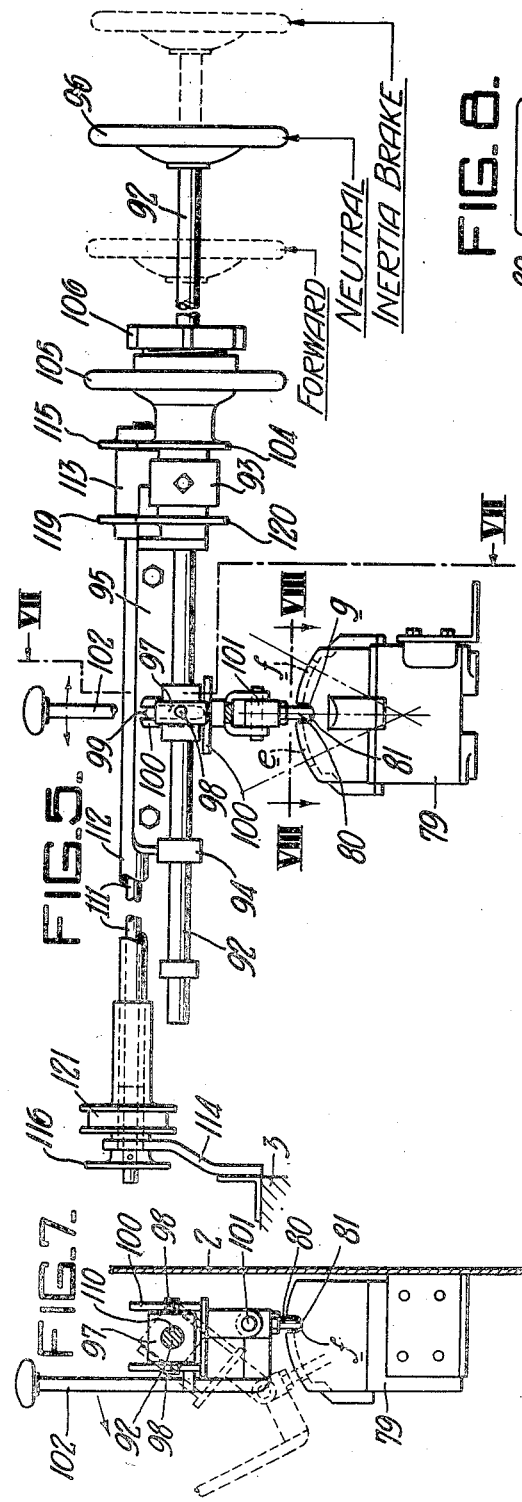

Patented Apr. 4, 1950

2,502,969

UNITED STATES PATENT OFFICE 2,502,969

POWER INPUT CONTROL FOR WELL-DRILLING HOISTS

August R. Maier, Oil City, Pa., assignor to Oil Well Supply Company, a corporation of New Jersey Application January 30, 1945, Serial No. 575,307

8 Claims. (Cl. 192—4)

My invention relates to improvements in a power input control for well drilling hoists, and contemplates a selective integrated control for the power delivered to the hoist in both forward and reverse directions, together with the selective application of a neutral or inertia brake thereto.

This invention has in view the provision of a forward clutch, reversing means and an inertia brake located on the power input shaft and having a single means for actuating the same independently and in any sequence of operation, whereby the operator may readily control the power delivered to the hoist in accordance with drilling requirements.

Also, the invention contemplates in such a unitary control, the selective speed control of one or two prime movers, and the combined control of two prime movers, to further enable flexibility of power control to the hoist and to other drilling equipment in accordance with drilling requirements.

Additional objects and advantages of my invention will become apparent from the following description taken in connection with the accompanying drawings, wherein:

Fig. 1 is a schematic plan view of a well drilling hoist embodying my invention;

Fig. 2 is a partial side view thereof, showing the inertia brake and its actuating means;

Fig. 3 is an elevational view, partly in section, illustrating the master clutch;

Fig. 4 is a sectional view taken on the line IV—IV of Fig. 1, showing the master clutch reverse brake and its actuating means;

Fig. 5 is an elevational view of the power input control for the hoist;

Fig. 6 is a longitudinal sectional view of the control of Fig. 5;

Fig. 7 is a sectional view taken on the line VII—VII of Fig. 5; and

Fig. 8 is a sectional view taken on the line VIII—VIII of Fig. 5.

Referring to the drawings, Fig. 1 illustrates a hoisting unit incorporating a drawworks generally similar to that shown in my prior Patent No. 2,315,157, issued March 30, 1943. Mounted upon one end of a suitable base structure 2 are a pair of prime movers, as for example, internal combustion engines 3 and 3a, arranged in parallel relation transversely of said base with engine 3a having a driving connection a with engine 3 between shaft extensions 3b and 3c of said engines. Shaft extension 3c of engine 3 is provided with a pulley 4 connected to the pulley 5 of a master reverse clutch 6 by means of belts 7, said clutch being mounted on and driving a transverse horizontal power input or jack shaft 8 rotatably supported on the base 2.

The jack shaft 8 drives the line shaft 12 which in turn drives drum shaft 13, both of said shafts being rotatably supported in parallelism by suitable frames and bearings. Shaft 13 carries a drum 14 for the hoisting cable. The drive to the line shaft is accomplished through a pair of clutch-controlled sprockets 15 and 16 rotatable on the jack shaft 8 and being chain connected with sprockets 17 and 18, respectively, on the line shaft 12, the said respective sprockets selectively driving said line shaft at different speeds through a clutch 19 slidable on the jack shaft between sprockets 15 and 16.

Line shaft 12 drives the drum shaft 13 through selective speed chain drives, including sprockets 20 and 21 on said line shaft and respective sprockets 22 and 23 on the drum shaft, the latter having clutches 24 and 25 respectively.

The jack shaft 8 also drives a rotary drive shaft 26 carried in suitable bearings through selective speed chain drives, including sprockets 27 and 28 on the jack shaft respectively connecting sprockets 29 and 30 on the rotary drive shaft, the latter having clutches 31 and 32 respectively. Sprockets 27 and 28 comprise a double sprocket loosely mounted on the jack shaft and has a coacting clutch 58 for selectively connecting the dual sprocket to said shaft. An outboard sprocket 33 on the shaft 26 drives a rotary (not shown) by means of a chain 34 and a double idler sprocket 35 supported on a suitable trunnion.

As disclosed in my said prior patent, the selective transmission of power from the power input or jack shaft 8 through the foregoing chain drives to the drum shaft is controlled through a shift lever 48 through suitable connections to the clutch 19, and by means of foot pedals 55 and 56 respectively actuating clutches 25 and 24. Also, through suitable linkages, a foot pedal 60 actuates clutch 58, and a shift lever 64 actuates the clutches 31 and 32 to selectively drive the rotary drive shaft 26 from said jack shaft. During the operation of said drives, the power input to and direction of rotation of the jack shaft are controlled by the master reverse clutch 6.

My invention particularly relates to the selective integrated control and operation of the master clutch 6, the reverse brake 10 therefor, and an inertia or neutral brake 65 on the power input or jack shaft 8, whereby the transmission of power to the hoist and the operation of the multiple speed drives to the drum and rotary drive shafts may be accomplished with minimum effort and with the speed required in well drilling practice. In addition, the said selective control provides for the speed or throttle control of one or both of the engines 3 and 3a.

To these ends, the master clutch 6 is fluid-actuated as by means of an inflatable continuous rubber tube 66 carried by and within an annular housing 67 keyed to the jack shaft 8, and having a brake band liner 68 adapted to engage a clutch drum 69 freely rotatable on said shaft and bolted to the free pulley 5, as shown in Fig. 3. A spider 70 is likewise secured to pulley 5 and includes an outer planetary gear 71, mashing with planetary intermediate idler gears 72 carried by a second spider 73 bolted to the drum 74 of the reverse brake 10, which drum is freely rotatable on the jack shaft. An inner planetary gear 75 meshes with the idlers 72 and is keyed to said jack shaft.

Hence, upon inflating the member 66, the jack shaft 8 may be driven through housing 67 in a forward direction from pulley 5. Upon releasing said forward drive and actuating the brake band 76 of reverse brake 10, the spider 73 is held stationary and shaft 8 is thereby driven in a reverse direction from pulley 5 through the planetary gear system. The inertia brake 65 through its brake band 77 is employed to retard the speed of the jack shaft and its rotating parts as hereinafter set forth, the drum 78 of said brake being keyed to said shaft.

For the purpose of selectively actuating the master clutch, its reverse brake and the inertia brake in any sequence, I provide a three-way metering fluid valve 79 having a single operating handle or lever 80 movable in a T-slot 81 in the valve casing to admit fluid from a supply line 82, such as an air pressure line, to three outlets, each controlled by said travel of the lever in a leg of the T-slot. When said lever is positioned at the juncture of the legs of the T-slot, the valve mechanism connects all of said outlets to the atmosphere and closes the supply line 82. Such a valve likewise delivers variable pressures from zero to maximum supply pressure in accordance with the movement of the lever 80 from said juncture to the extremities of each of the legs of the T-slot.

The two outlets of said valve 79 corresponding to and controlled by movement of the lever 80 in the aligned legs e and f of the T-slot 82 are each connected with a fluid line as follows. The outlet corresponding to leg e is connected by a line 83 with the clutch tube 66 of the master clutch through a swivel 84 and a communicating conduit 85 on the clutch housing 67, and the outlet corresponding to leg f is connected by a line 86 with a fluid cylinder 87 secured to the base 2, the piston of said cylinder being connected to the free end of the brake band 77 of the inertia brake 65 through a bell crank 88.

The outlet of valve 79 corresponding to and controlled by the lateral travel of the lever 80 in the intermediate right angle leg g of the T-slot 81 is connected by a line 89 to a fluid cylinder 90 secured to the base 2, the piston thereof being connected to the free end of brake band 76 of reverse brake 10 through a bell crank 91. The valve 79 therefore comprises a unit, selectively actuating the master clutch, its reverse brake and the inertia brake, combined with a control means in the following manner.

Positioned above and extending parallel to the aligned legs e and f of the T-slot 81 of valve 79, I provide hand controls including a control shaft 92 slidably and rotatably disposed in spaced bearings 93 and 94 carried by the supporting structure 95 of the hoist. The shaft 92 is provided with a handwheel 96 at the outer end thereof, and intermediate its length and immediately above the valve 79, is provided with a square collar 97 freely pivoted thereon and reciprocable therewith, said collar having lateral trunnions 98 thereon whose axis extends parallel with the leg g of the T-slot 81 in said valve. The trunnions 98 are entered in the vertical slots 99 of a bifurcated yoke 100, the latter having a pin and clevis connection 101 with the lever 80 of valve 79, the pivotal axis of the pin and clevis connection being disposed at right angles to the axis of said trunnions 98. By means of such connection, sliding movement of the shaft 92 will move the control lever 80 of said valve in the legs e and f of the T-slot 81. When said control lever is in the intermediate or "neutral" position at the juncture of the legs of said T-slot, the control lever 80 may be moved laterally into the leg g of the T-slot 81 by means of a hand lever 102, as more particularly shown in the dotted line position of Fig. 7.

The bearing 93 mounts a sleeve 103 telescoped over the shaft 92, which sleeve rotatably supports a sprocket 104 having a handwheel 105 rotatable therewith. The hub of the handwheel 105 is provided with a jam nut 106, coacting with a washer 107 keyed to the shaft 92, whereby the handwheel 105 and sprocket 104 may be locked for rotation with the shaft 92 by means of the pressure of the jam nut against a fiber washer 108 interposed between the washer 107 and a transverse face 109 on the hub of handwheel 105. The keyed engagement of the washer 107 with shaft 92 includes an elongated longitudinal keyway 110 in said shaft to permit sliding movement of the latter at all times.

Mounted in parallel spaced relation to the shaft 92, are telescoped throttle shafts, including an inner shaft 111 and an outer shaft 112, the said shafts being supported in suitable bearings 113 and 114, the latter bearing being positioned on the cover or framework of the engine 3. The shaft 111 is provided with a sprocket 115 which is connected by a chain with sprocket 104, and the end of said shaft adjacent the engine 3 is provided with a sprocket 116 which is connected by a continuous chain 117 with a rotatable sprocket control 118 of engine 3a, as illustrated in Fig. 1.

The outer shaft 112 is provided with a sprocket 119 which is connected with a sprocket 120 on the shaft 92, the said sprocket 120 having keyed engagement with the keyway 110 of said shaft. At the end thereof adjacent the engine 3, the shaft 112 is provided with a pulley 121 which is connected by a suitable belt 122 with a rotatable pulley throttle control 123 on the engine 3.

The shaft 92, handwheels 96 and 105, and valve 79 with its hand lever 102, are conveniently located adjacent to the position of the driller when operating the hoist. Upon moving the control shaft 92 inward to the "forward" position of Fig. 5, the control lever 80 of valve 79 is moved into slot e, thereby admitting air to inflate the tube 66 of the master clutch 6, whereby the power input shaft 8 is driven in a forward direction by the engines 3 and 3a. By rotation of the handwheel 96, the speed of engine 3 may be adjusted by the resulting movement of its throttle, and similarly handwheel 105 may be rotated to control the speed of engine 3a. In addition to such independent control of the engine throttles, upon adjustment of the jam nut 106, the throttles of both of the engines may be simultaneously adjusted by rotation of either of the handwheels 96 and 105.

In order to prevent grabbing of the master clutch 6, I prefer to provide a choke 124 in the line 83 which will have a reduced opening therethrough to prevent the sudden application of full fluid pressure upon the clutch.

As the control shaft 92 is moved to the "neutral" or intermediate position, as shown in Fig. 5, the air line 83 to the master clutch 6 will be exhausted to the atmosphere, and while the same may be accomplished through the action of valve 79 alone, I prefer to provide a self-acting, quick release valve 125 positioned in the line 83 adjacent the clutch and between said clutch and the choke 124, which valve is immediately operable upon release of the pressure in said line to release the air in said clutch. Hence, in the "neutral" position, no power is applied to the shaft 8.

Continued outward movement of the control shaft 92 to the "inertia brake" position of Fig. 5, moves the control lever 80 in slot f of the valve 79 to energize the inertia brake 65 by supplying air to its cylinder 87. Such braking action will serve to slow down or stop the rotation of shaft 8 and its parts, to enable the manipulation of the various jaw clutches of the hoist, as by means of the controls 48, 64, 55, 56 and 60.

To reverse the direction of rotation of the power input shaft 8 and therefore the operation of the hoist, the control shaft 92 is placed in "neutral" position, and the operator moves the lever 80 of valve 79 into slot g by means of the reverse lever 102.

It will therefore be seen that I have provided an integrated control for the power input shaft of the hoist whereby the operator may readily and quickly drive the hoist in either forward or reverse direction, and whereby the momentum of the rotating parts of the hoist may be quickly retarded when changing the direction of rotation or when it is desired to stop the hoist drive for any reason. Also, by means of said control, the operator may regulate the speed of the drive, either by simultaneously adjusting both engine throttles or by individually regulating the same, as for example, when only one engine is connected to the input shaft 8, i. e., engine 3, and engine 3a is employed for driving a slush pump or the like by means of a pulley and belt 126 driven by shaft extension 3b. Likewise, a throttle control may be readily provided for a single engine drive through shaft 92, sprockets 119 and 120 and pulley 121 only.

The employment of the fluid-actuated means for the master clutch and its reverse brake, as well as for the inertia brake, and the combination thereof with the control means, whereby the operation of said elements is individually applicable to the power input to the hoist without excessive physical exertion, provides for highly efficient and flexible operation of the hoist.

Various changes and modifications are contemplated within the scope of the following claims.

I claim:

1. In a well drilling hoist, the combination with a power input shaft, of means for driving said shaft from a prime mover including a forward clutch and a reversing means on the shaft, an inertia brake on said shaft, actuating means for each of said clutch, reversing means and brake, and a single control for energizing said actuating means individually in any sequence, said control including means deenergizing said actuating means prior to completing any said sequence.

2. In a well drilling hoist, the combination with a power input shaft, of means for driving said shaft from a prime mover including a fluid-actuated forward clutch and a fluid-actuated reversing means on the shaft, a fluid-actuated inertia brake on the shaft, a three-way fluid valve connected with a source of fluid supply, and fluid conduits connecting said valve and each of said clutch, reversing means and brake, said valve being operable to connect said conduits with the fluid supply individually in any sequence and having means exhausting said conduits to the atmosphere between sequential connections of said valve and conduits.

3. In a well drilling hoist, the combination with a power input shaft, of means for driving said shaft from a prime mover including a fluid-actuated forward clutch and a fluid-actuated reversing means on the shaft, a fluid-actuated inertia brake on the shaft, a three-way fluid valve connected with a source of fluid supply, fluid conduits connecting said valve and each of said clutch, reversing means and brake, said valve being operable to connect said conduits with the fluid supply individually in any sequence and having means exhausting said conduits to the atmosphere between sequential connections of said valve and conduits, a fluid choke in the forward clutch conduit, and a quick release valve in said conduit between said clutch and choke.

4. In a well drilling hoist, the combination with a power input shaft, of means for driving said shaft from a prime mover including a fluid-actuated forward clutch and a planetary reverse gearing on the shaft, a fluid-actuated brake for the planetary reverse gearing, an inertia brake on said shaft, actuating means for each of said clutch, planetary reverse brake and inertia brake, and a single control for energizing said actuating means individually in any sequence, said control including means deenergizing said actuating means prior to completing any said sequence.

5. In a well drilling hoist, the combination with a power input shaft, of means for driving said shaft from a prime mover including a forward clutch and a reversing means on the shaft, an inertia brake on said shaft, actuating means for each of said clutch, reversing means and brake, a single device for energizing said actuating means individually in any sequence, said device including means for deenergizing said actuating means prior to completing any said sequence, and an adjustable throttle control for said prime mover, said control being mounted for movement independently of said throttle adjustment and connected with said single device for actuating the latter by said movement.

6. In a well drilling hoist, the combination with a power input shaft, of means for driving said shaft from a prime mover including a fluid-actuated forward clutch and a fluid-actuated reversing means on the shaft, a fluid-actuated inertia brake on the shaft, a three-way fluid valve connected with a source of fluid supply, fluid conduits connecting said valve and each of said clutch, reversing means and brake, said valve being operable to connect said conduits with the fluid supply individually, and an adjustable throttle control for said prime mover, said control being mounted for movement independently of said throttle adjustment and connected with said valve for actuating the latter by said movement.

7. In a well drilling hoist, the combination with a power input shaft, of means for driving said shaft from a prime mover including a fluid-actuated forward clutch and a fluid-actuated reversing means on the shaft, a fluid-actuated inertia brake on the shaft, a three-way fluid valve connected with a source of fluid supply, said valve having an operating lever movable between two aligned positions on either side of a neutral position and a third position laterally of said neutral position, said valve having fluid conduits individually connected by said three locations of the valve lever with the fluid supply and with the atmosphere in said neutral position, and a reciprocable control engaging the valve lever for movement thereof between its said aligned positions, said lever being disengageable therefrom in neutral position for independent lateral movement in its said third position, said fluid conduits being individually connected with the forward clutch, reversing means and inertia brake whereby the same may be energized individually in any sequence.

8. In a well drilling hoist, the combination with a power input shaft, of means for driving said shaft from a prime mover including a fluid-actuated forward clutch and a fluid-actuated reversing means on the shaft, a fluid-actuated inertia brake on the shaft, a three-way fluid valve connected with a source of fluid supply, said valve having an operating lever movable between two aligned positions on either side of a neutral position and a third position laterally of said neutral position, said valve having fluid conduits individually connected by said three locations of the valve lever with the fluid supply and with the atmosphere in said neutral position, and a reciprocable control engaging the valve lever for movement thereof between its said aligned positions, said lever being disengageable from said control in neutral position for independent lateral movement in its said third position, said fluid conduits being individually connected with the forward clutch, reversing means and inertia brake whereby the same may be energized individually in any sequence, said control being rotatable and having rotatable connection with the throttle of said prime mover independently of the reciprocation of said control.

AUGUST R. MAIER.

REFERENCES CITED

The following references are of record in the file of this patent:

UNITED STATES PATENTS

| Number | Name | Date |
|---|---|---|
| 870,458 | Painter | Nov. 5, 1907 |
| 905,637 | Beskow | Dec. 1, 1908 |
| 929,520 | Truxal | July 27, 1909 |
| 985,958 | Wetterwald | Mar. 7, 1911 |
| 1,091,160 | Phillips | Mar. 24, 1914 |
| 1,711,896 | McLean | May 7, 1929 |
| 1,844,037 | Heinish | Feb. 9, 1932 |
| 1,979,488 | Perez | Nov. 6, 1934 |
| 2,136,454 | Miller | Nov. 15, 1938 |
| 2,144,032 | Price | Jan. 17, 1939 |
| 2,165,350 | Davidson et al. | July 11, 1939 |